United States Patent
Arumugam et al.

(10) Patent No.: US 10,148,556 B2
(45) Date of Patent: *Dec. 4, 2018

(54) LINK AGGREGATION GROUP (LAG) SUPPORT ON A SOFTWARE-DEFINED NETWORK (SDN)

(71) Applicant: Lenovo Enterprise Solutions (Singapore) Pte. Ltd., Singapore (SG)

(72) Inventors: Sivakumar Arumugam, Milpitas, CA (US); Chidambaram Bhagavathiperumal, Santa Clara, CA (US); Dillibabu Kodamala, Sunnyvale, CA (US); Ashok Kumar Mutthaiyanvalasu Somosundaram, Santa Clara, CA (US)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 15/384,086

(22) Filed: Dec. 19, 2016

(65) Prior Publication Data

US 2017/0099215 A1 Apr. 6, 2017

Related U.S. Application Data

(63) Continuation of application No. 14/231,258, filed on Mar. 31, 2014, now Pat. No. 9,559,946.

(51) Int. Cl.
*H04L 12/709* (2013.01)
*H04L 12/24* (2006.01)
(Continued)

(52) U.S. Cl.
CPC ........ *H04L 45/245* (2013.01); *H04L 41/0816* (2013.01); *H04L 45/38* (2013.01); *H04L 49/253* (2013.01); *Y02D 50/30* (2018.01)

(58) Field of Classification Search
CPC ..... H04L 45/245; H04L 45/745; H04L 45/56; H04L 45/586; H04L 49/70; H04L 49/10; H04L 63/0272
See application file for complete search history.

(56) References Cited

U.S. PATENT DOCUMENTS

| 6,697,087 B1 * | 2/2004 | Kelly | H04L 41/22 715/734 |
| 2009/0240790 A1 * | 9/2009 | Utsunomiya | H04L 12/4645 709/221 |

(Continued)

*Primary Examiner* — Ian N Moore
*Assistant Examiner* — Brian T Le
(74) *Attorney, Agent, or Firm* — Zilka-Kotab, P.C.

(57) ABSTRACT

In one embodiment, a system includes a software-defined network (SDN) controller including a processor and logic executable by the processor. The logic is executable by the processor to receive a port addition indication that a logical port is configured on a switching device, the switching device being coupled to the SDN controller and a second device, with the logical port representing a link aggregation group (LAG) that includes at least two links between the switching device and the second device. The logic is also executable by the processor to derive and maintain a logical index for all logical ports in software-defined switching devices connected to the SDN controller based on logical port identifiers thereof. Other systems, methods, and computer program products are described in accordance with more embodiments.

18 Claims, 6 Drawing Sheets

(51) Int. Cl.
*H04L 12/721* (2013.01)
*H04L 12/937* (2013.01)

(56) References Cited

U.S. PATENT DOCUMENTS

| | | | | |
|---|---|---|---|---|
| 2013/0108263 A1* | 5/2013 | Srinivas | ............... | H04Q 3/0083 398/45 |
| 2015/0003290 A1* | 1/2015 | Kusumoto | .............. | H04L 45/16 370/254 |
| 2015/0172222 A1* | 6/2015 | Liao | ...................... | H04L 49/356 370/392 |

* cited by examiner

LINK AGGREGATION GROUP (LAG) SUPPORT ON A SOFTWARE-DEFINED NETWORK (SDN)

BACKGROUND

The present invention relates to software-defined networks (SDNs), and more particularly, to supporting link aggregations groups (LAGs) in a SDN.

There are several different SDN standards that are used to create and manage SDNs. One such SDN standard is OpenFlow, which defines a communications protocol that provides access to a forwarding plane of a network switch, router, or some other communication device, via an existing network.

In the current OpenFlow specification, LAG support is not clearly mentioned and the specification only represents LAG as logical ports. Accordingly, it would beneficial to have LAG support clearly defined and supported in a SDN, such as a SDN which implements OpenFlow.

SUMMARY

In one embodiment, a system includes a software-defined network (SDN) controller including a processor and logic executable by the processor. The logic is executable by the processor to receive a port addition indication that a logical port is configured on a switching device, the switching device being coupled to the SDN controller and a second device, with the logical port representing a link aggregation group (LAG) that includes at least two links between the switching device and the second device. The logic is also executable by the processor to derive and maintain a logical index for all logical ports in software-defined switching devices connected to the SDN controller based on logical port identifiers thereof.

In another embodiment, a computer-implemented method includes receiving a port addition indication at a SDN controller that a logical port is configured on a switching device. The switching device is coupled to the SDN controller and a second device, and the logical port represents a LAG that includes at least two links between the switching device and the second device. The method also includes deriving and maintaining a logical index for all logical ports in software-defined switching devices coupled to the SDN controller based on logical port identifiers thereof.

In another embodiment, a computer program product includes a computer readable storage medium having program code embodied therewith. The program code is executable by a processor to send a port addition indication to a SDN controller in response to a determination that a logical port has been configured on a switching device in the SDN, the switching device being coupled to the SDN controller and a second device, with the logical port representing a LAG that includes at least two links between the switching device and the second device. The program code is also executable by the processor to send a logical port removal indication to the SDN controller in response to a determination that the logical port has been removed from the SDN. Also, the program code is executable by the processor to send an indication of a speed change for the logical port in response to a determination selected from a group including: a determination that one or more ports have been added as member ports of the logical port, and a determination that one or more member ports of the logical port have been removed, to reflect a change in overall speed of the logical port. The program code is also executable by the processor to send an indication of a status change for the logical port to the SDN controller in response to the logical port changing an operational status selected from a group of statuses including: operational and non-operational.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods, and computer program products for supporting link aggregation group (LAG) techniques in a software-defined network (SDN) environment, such as a SDN implementing OpenFlow.

Specifically, implementation details for LAG on an OpenFlow-enabled network are provided. Also, an abstraction for a LAG index referred to as a logical port is provided to aid in the implementation, along with the management of various operations to and/or from a SDN controller over a LAG.

In one general embodiment, a system includes a SDN controller including a processor and logic integrated with and/or executable by the processor, the logic being configured to: receive a port addition indication that a logical port is configured on a switching device, the switching device being connected to the SDN controller and a second device, wherein the logical port represents a LAG that includes at least two links between the switching device and the second device, and derive and maintain a logical index for all logical ports in software-defined switching devices connected to the SDN controller based on logical port identifiers thereof.

In another general embodiment, a method for supporting link aggregation in a SDN includes receiving a port addition indication at a SDN controller that a logical port is configured on a switching device, the switching device being connected to the SDN controller and a second device, wherein the logical port represents a LAG that includes at least two links between the switching device and the second device, and deriving and maintaining a logical index for all logical ports in software-defined switching devices connected to the SDN controller based on logical port identifiers thereof.

In another general embodiment, a computer program product for supporting link aggregation in a SDN includes a computer readable storage medium having program code embodied therewith, the program code readable and/or executable by a processor to cause the processor to: send a port addition indication to a SDN controller when a logical port is configured on a switching device in the SDN, the switching device being connected to the SDN controller and a second device, wherein the logical port represents a LAG that includes at least two links between the switching device and the second device, send a logical port removal indication to the SDN controller when the logical port is removed from the SDN, send an indication of a speed change for the logical port when one or more ports are added as member ports of the logical port and/or when one or more member ports of the logical port are removed to reflect a change in overall speed of the logical port, and send an indication of a status change for the logical port to the SDN controller in response to the logical port changing from operational to non-operational or from non-operational to operational.

Figure 1:
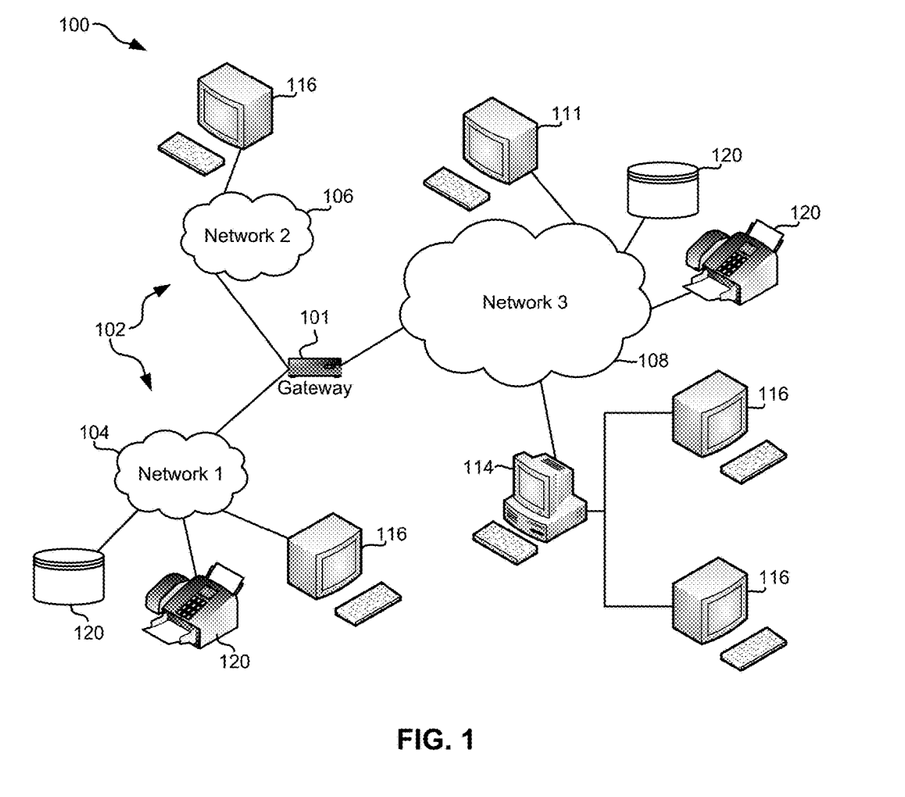
FIG. 1 illustrates a network architecture, in accordance with one embodiment.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
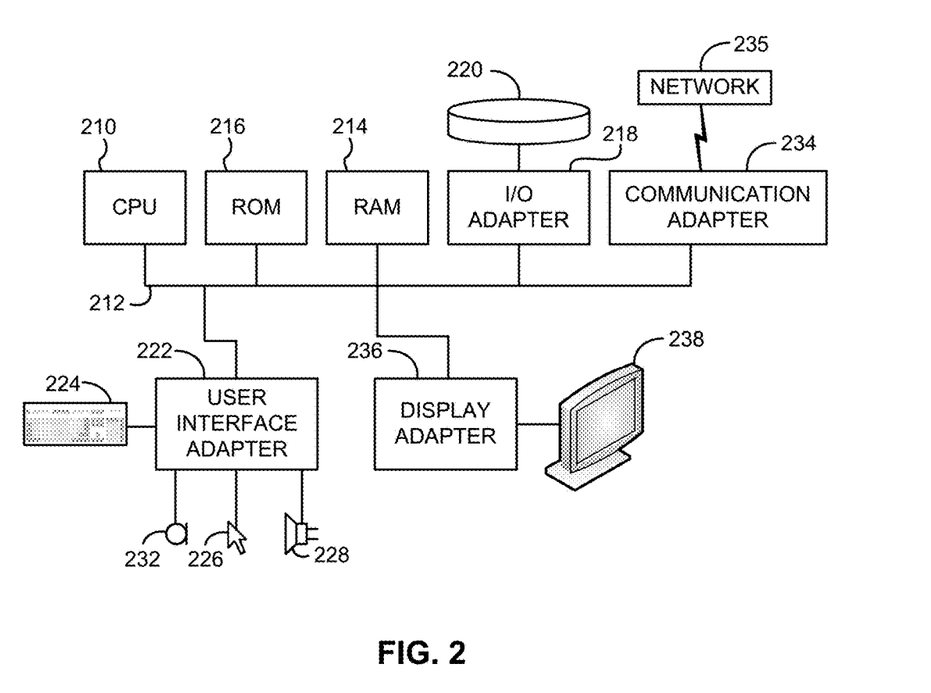
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages.

Figure 3:
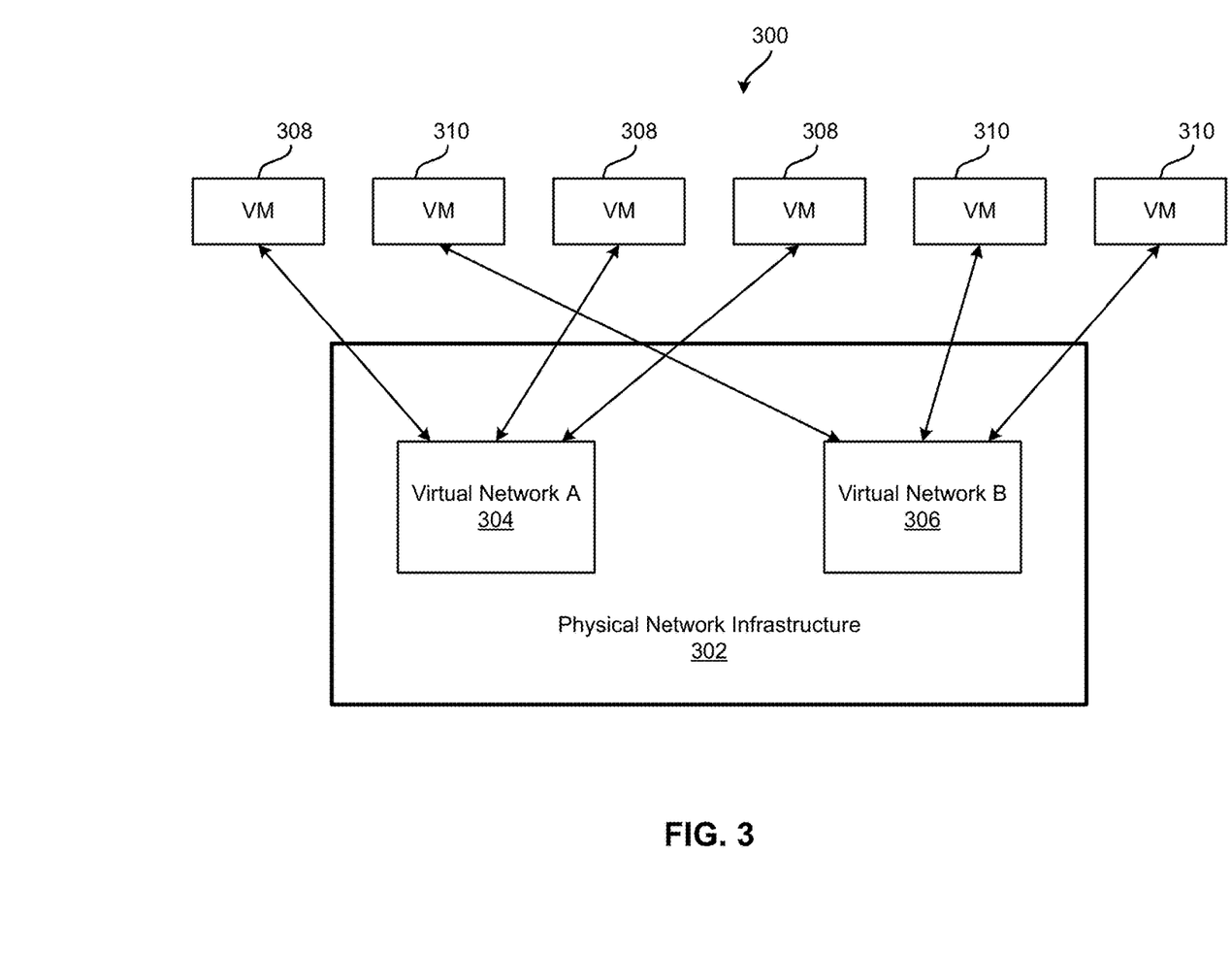
FIG. 3 is a simplified diagram of a virtualized data center, according to one embodiment.

Referring now to FIG. 3, a conceptual view of an overlay network 300 is shown according to one embodiment. In order to virtualize network services, other than simply providing a fabric path (connectivity) between devices, an appliance cloud may be virtualized. The overlay network 300, in one approach, comprises one or more virtual networks 304, 306 within a physical (real) network infrastructure 302. The network infrastructure 302 may include any components, hardware, software, and/or functionality typically associated with and/or used in a network infrastructure, including, but not limited to, switches, connectors, wires, circuits, cables, servers, hosts, storage media, operating systems, applications, ports, I/O, etc., as would be known by one of skill in the art.

Each virtual network 304, 306 may include any number of virtual machines (VMs) 308, 310. In one embodiment, Virtual Network A 304 includes one or more VMs 308, and Virtual Network B 306 includes one or more VMs 310. As shown in FIG. 3, the VMs 308, 310 are not shared by the virtual networks 304, 306, but instead are exclusively included in only one virtual network 304, 306 at any given time.

Figure 4:
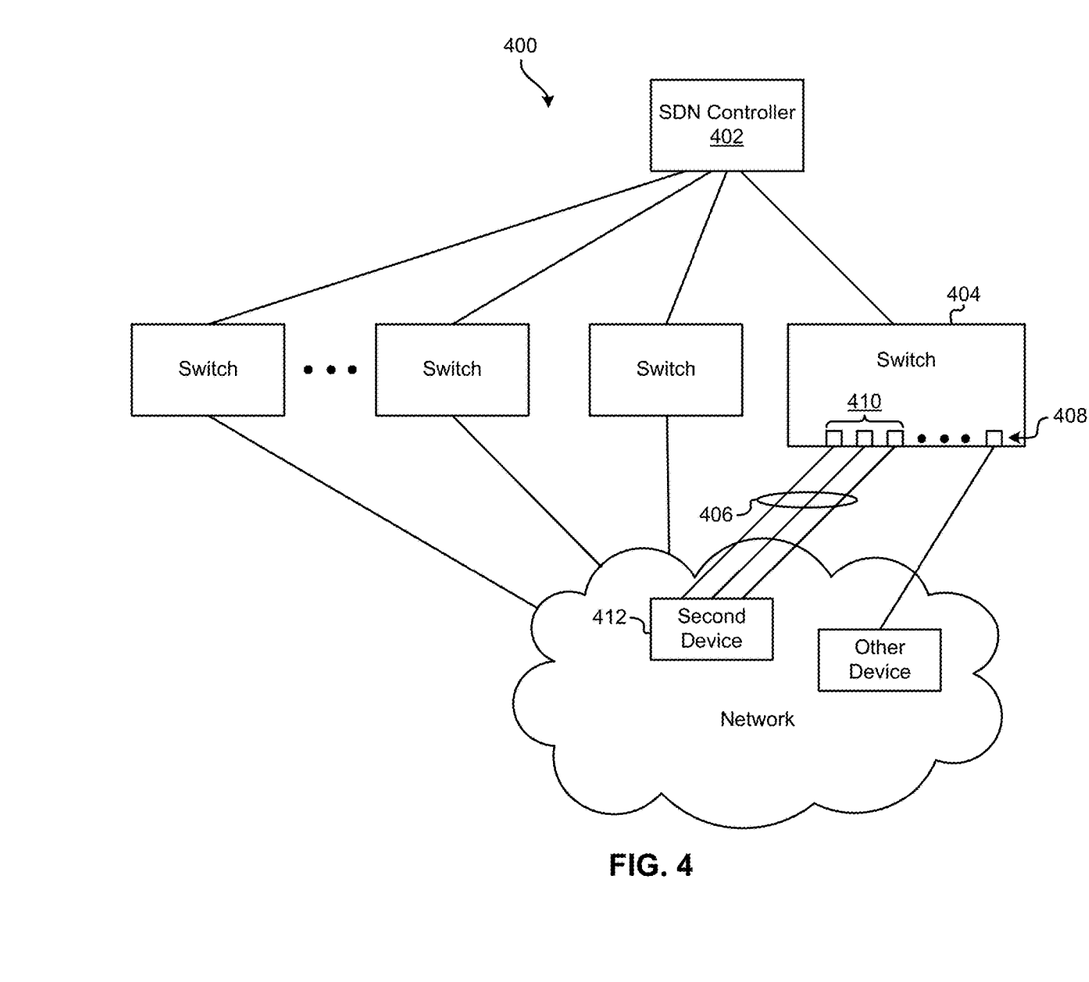
FIG. 4 shows a software-defined network (SDN) illustrating various communication paths.

Now referring to FIG. 4, a network layout is shown for a SDN 400, according to one embodiment. Various LAG-related functions may be implemented in the SDN 400, in different approaches. In order to implement a LAG, the LAG is first set-up by an administrator, user, application, or some other suitable entity, human or machine, as would be known in the art. This entity may have access to a switch, router, or some other switching device capable of having LAGs enabled thereon. As shown in FIG. 4, the LAG 406 is setup on a switch 404, but the embodiments described herein are not so limited.

Furthermore, the LAG 406, for sake of description, may be referred to as a logical port herein, as that is the term given to such a construct by the OpenFlow standard.

The SDN controller 402 may be connected to a plurality of switches and/or other devices capable of communicating with the SDN controller 402 according to whichever protocol(s) that the SDN controller 402 uses.

The switch 404 includes a plurality of ports 408. In one embodiment, the switch 404 may be a legacy switch, and may have one or more software-defined ports, one or more legacy ports, and/or one or more LAG-enabled ports (logical ports), etc., according to various embodiments.

The administrator or other such entity configures the LAG 406 using a configuration mechanism of the switch 404 and configures a LAG identifier (ID) to be included in the configuration of the SDN 400, such as in OpenFlow via the OpenFlow configuration. The LAG 406 has a plurality of member ports 410 which are "bundled" together to provide increased bandwidth between the switch 404 and some other connected device, such as a second device 412 in the SDN 400.

When the logical port (LAG) 406 is added to the SDN 400 via OpenFlow, the LAG 406 inherits all the properties of an OpenFlow port. The switch 404 then sends a port status message or some other suitable communication to the SDN controller 402 specifying a logical index for the LAG 406. When the SDN 400 is configured using OpenFlow, a port add message may be used that is available in the specification while ensuring that a logical index is specified for the logical port (LAG) 406. The switch 404 is configured to derive and maintain the logical index based on the logical port identifiers (LAG-IDs) for each connected SDN-enabled switching device in the SDN 400. In this way, the existence of the LAG 406 and any other logical ports setup on other switching devices is made known to the SDN controller 402.

According to another embodiment, LAG 406 removal from the SDN 400 is initiated by the switch 404. For LAG 406 removal, the switch administrator or some other suitable entity may utilize the SDN 400 configuration to remove the LAG 406. For example, when the SDN 400 is configured using OpenFlow, the LAG 406 may be removed using the OpenFlow configuration. When the LAG 406 is removed from the SDN 400, all of the properties of the ports on which the LAG 406 was enabled will be reset to legacy switch ports. So, for example, when the LAG 406 is setup in OpenFlow, the LAG 406 automatically inherits the properties of the OpenFlow port. Therefore, upon removal of the LAG 406, all the properties of the ports configured in the LAG 406 return to legacy settings. The switch 404 then sends a port remove message, such as a message available in the SDN configuration specification (such as OpenFlow), to the SDN controller 402. The port remove message includes the logical port identifier for the logical port (LAG) 406.

In another embodiment, to indicate one or more changes to a LAG 406, membership changes may be indicated to the SDN controller 402. Since LAG is a legacy configuration, the member ports 410 of the LAG 406 may be removed and additional port(s) 410 may be added to the LAG 406 using legacy LAG commands in the switch 404. For all LAG member configuration changes, the switch 404 may indicate to the SDN controller 402 the change in speed for the LAG 406, without notifying the SDN controller 402 of any specific ports that are included in the LAG 406. Instead, the SDN controller 402 only has visibility to the logical port (LAG) 406 as it is prepared b the switch 404, according to one embodiment. The LAG 406 is considered to be operationally available (up) when one or more member ports 410 are up. Conversely, the LAG 406 is considered to be operationally unavailable (down) when all member ports 410 are down.

According to another embodiment, in order to indicate a link status change for a member port 410 in the LAG 406, the following communication procedures may be utilized. For all LAG member link status changes (link up/link down) the switch 404 may indicate to the SDN controller 402 a change in speed for the LAG 406 due to a change in status of one or more links between member ports 410 and the second device 412. The LAG 406 is considered as operationally available (up) when at least one member port 410 is operational (up), and the LAG 406 is considered operationally unavailable (down) when all member ports 410 are nonoperational (down).

In accordance with another embodiment, port modification (mod) operations may be used in the context of the LAG 406. The SDN controller 402 may be configured to send port-mod messages using the logical index for the LAG 406. Upon receipt of a port-mod message, the switch 404 is configured to apply whatever modifications are indicated by the message to all member ports 410 of the LAG 406. In addition, the LAG ID may be derived based on the logical index, such as via reverse mapping or some other suitable determination mechanism known in the art.

The following descriptions of exemplary flow-mod operations is a non-exhaustive list, and other flow-mod operations may be configured to be recognized by the switch 404 and sent by the SDN controller 402.

In one embodiment, the SDN controller 402 may be configured to send a "Match in_port—logical port" message. When a flow-mod message that has a match for the qualifier "in_port—logical port" as the logical port (LAG) 406 is received from the SDN controller 402, the switch 404 is configured to derive the LAG ID, as described previously, and install the one or more flows included in the flow-mod message to all the member ports 410 of the LAG 406.

In another embodiment, the SDN controller 402 may be configured to send a "Match in_port—any port" message. When a flow-mod message is received that has the qualifier "in_port—any port" is received from the SDN controller 402, the switch 404 is configured to install the one or more flows included in the flow-mod message to all physical ports 408 of the switch 404 and any logical ports (LAG) 406 of the switch 404.

According to another embodiment, when a flow-mod message with "Action all—logical port(s)" is received from the SDN controller 402, the switch 404 is configured to install the one or more flows indicated in the flow-mod message with redirect ports having all the member ports 410 of the LAG 406.

In another embodiment, when a flow-mod message with "Action all—logical port(s) and physical port(s)" is received from the controller, the switch 404 is configured to install the one or more flows indicated in the flow-mod message with redirect ports having all the member ports 410 of the LAG 406 and all physical ports 408 of the switch 404.

In yet another embodiment, when a flow-mod message with "Action all" is received from the controller, the switch 404 is configured to install the one or more flows indicated in the flow-mod message with redirect ports having all physical ports 408 of the switch 404 and all the LAGs 406 of the switch 404.

For some packet-in operations, when a packet is received on a member port 410 of the LAG 406, the switch 404 is configured to notify the SDN controller 402 with a predetermined port as the logical port and a predetermined port as the member port according to one embodiment, so that the SDN controller 402 is made aware of the packet being received. For example, for an OpenFlow-configured SDN 400, OFPXMT_OFB_IN_PORT may be used as the logical port (LAG) 406, and OFPXMT_OFB_IN_PHY_PORT may be used as the member port(s) 410 of the LAG 406.

For some packet-out operations, when the SDN controller 402 transmits a packet on the LAG 406, it notifies the switch 404 with a predetermined message, such as OFPT_PACKET_OUT, to indicate the desire to send out the packet on the LAG 406. The switch 404 is configured to extract the packet from the message and forward the packet on a first available member port 410 of the LAG 406.

In accordance with another embodiment, LAG statistics may be collected for packets sent/received via any LAG 406 of the switch 404. In response to a statistics request for one or more logical ports (LAGs) 406 of the switch 404, the switch 404 is configured to aggregate statistics for individual member ports 410 of the LAG 406, and then to relay the aggregated statistics for all member ports 410 of the LAG 406.

Figure 5:
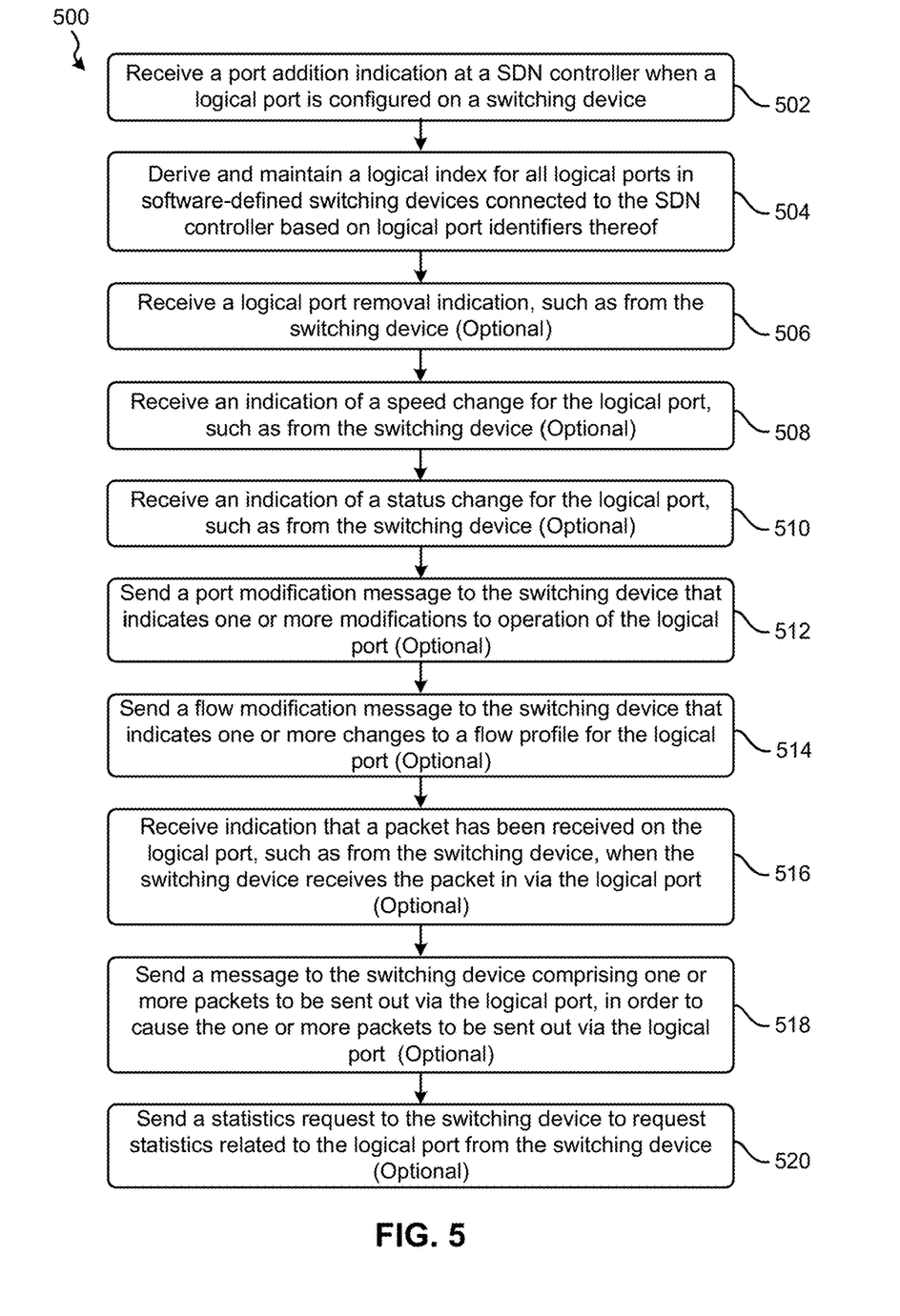
FIG. 5 shows a flow chart of a method according to one embodiment.

In one embodiment, referring to FIG. 5 a method 500 for providing a LAG in a SDN is shown according to one embodiment. The method 500 may be executed by a system using a processor which is configured to execute or otherwise cause the execution of embedded or standalone logic (which may be hardware, software, or a combination thereof) according to one embodiment. In another embodiment, the method 500 may be executed by a computer program product which comprises a computer readable storage medium having computer program code stored therein.

The method 500 may be performed in accordance with the present invention in any of the environments depicted in FIGS. 1-4 among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in one embodiment, the method 500 may be partially or entirely performed by a host, a server, a router, a switch, a switch controller (such as a SDN controller, an OpenFlow controller, etc.), a processor, e.g., a central processing unit (CPU), an application specific integrated circuit (ASIC), a field programmable gate array (FPGA), etc., one or more network interface cards (NICs), one or more virtual NICs, one or more virtualization platforms, or any other suitable device or component of a network system, cluster, or group of clusters.

In operation 502, a port addition indication is received at a SDN controller that a logical port is configured on a switching device. The switching device is connected to the SDN controller and a second device, and the logical port represents a LAG that comprises at least two links between the switching device and the second device, in one embodiment. In this way, the SDN controller is made aware of the presence of the logical port.

In one embodiment, the SDN may be configured according to OpenFlow standards, and the SDN controller may adhere to OpenFlow standards. Of course, any other known switch communication protocol and/or standard may be used, as would be known to one of skill in the art.

In operation 504, a logical index is derived and maintained for all logical ports in software-defined switching devices connected to the SDN controller based on logical port identifiers thereof. This includes adding the logical port indicated in operation 502 to the logical index.

In one embodiment, the port addition indication may be a port status message that includes at least a logical port identifier for the logical port. Using this logical port identifier, the SDN controller may add the logical port to the logical index.

In optional operation 506, a logical port removal indication may be received from the switching device. The logical port removal indication may be a port remove message that includes the logical port identifier for the logical port, in one approach. In response to receiving the logical port removal indication, the logical port may be removed from the logical index.

In optional operation 508, an indication of a speed change for the logical port may be received from the switching device. The indication of the speed change may represent one or more membership changes for the logical port. The speed for the logical port may be stored in association with the logical port identifier, such as in the logical index.

In optional operation 510, an indication of a status change for the logical port may be received from the switching device. The status change may represent whether the logical port is operational or non-operational in one approach. In response to receiving the status change, an operational status or a non-operational status may be indicated for the logical port, such as in the logical index or some other construct.

In optional operation 512, a port modification message may be sent to the switching device that indicates one or more modifications to operation of the logical port. The port modification message may indicate at least one of: stop all packets on the logical port, enable the logical port, and disable the logical port, among other possible port modifications known in the art.

In optional operation 514, a flow modification message may be sent to the switching device that indicates one or more changes to a flow profile for the logical port. The flow profile may be set according to standards, practices, and knowledge available to those of skill in the art. For example, tools available in OpenFlow may be used to set the flow profile for the switching device.

In optional operation 516, indication that a packet has been received on the logical port, such as from the switching device, may be received when the switching device receives the packet in via the logical port.

In optional operation 518, a message comprising one or more packets to be sent out via the logical port may be sent to the switching device, in order to cause the one or more packets to be sent out via the logical port (LAG).

In optional operation 520, a statistics request may be sent to the switching device to request statistics related to the logical port from the switching device. The statistics request may include requested statistics relating to the logical port, the switching device, or any other action, function, or system with which the switching device is capable of acquiring statistics. The statistics may include any traceable or measurable parameter known in the art, such as packets sent, packets received, delay, time lag, etc.

Figure 6:
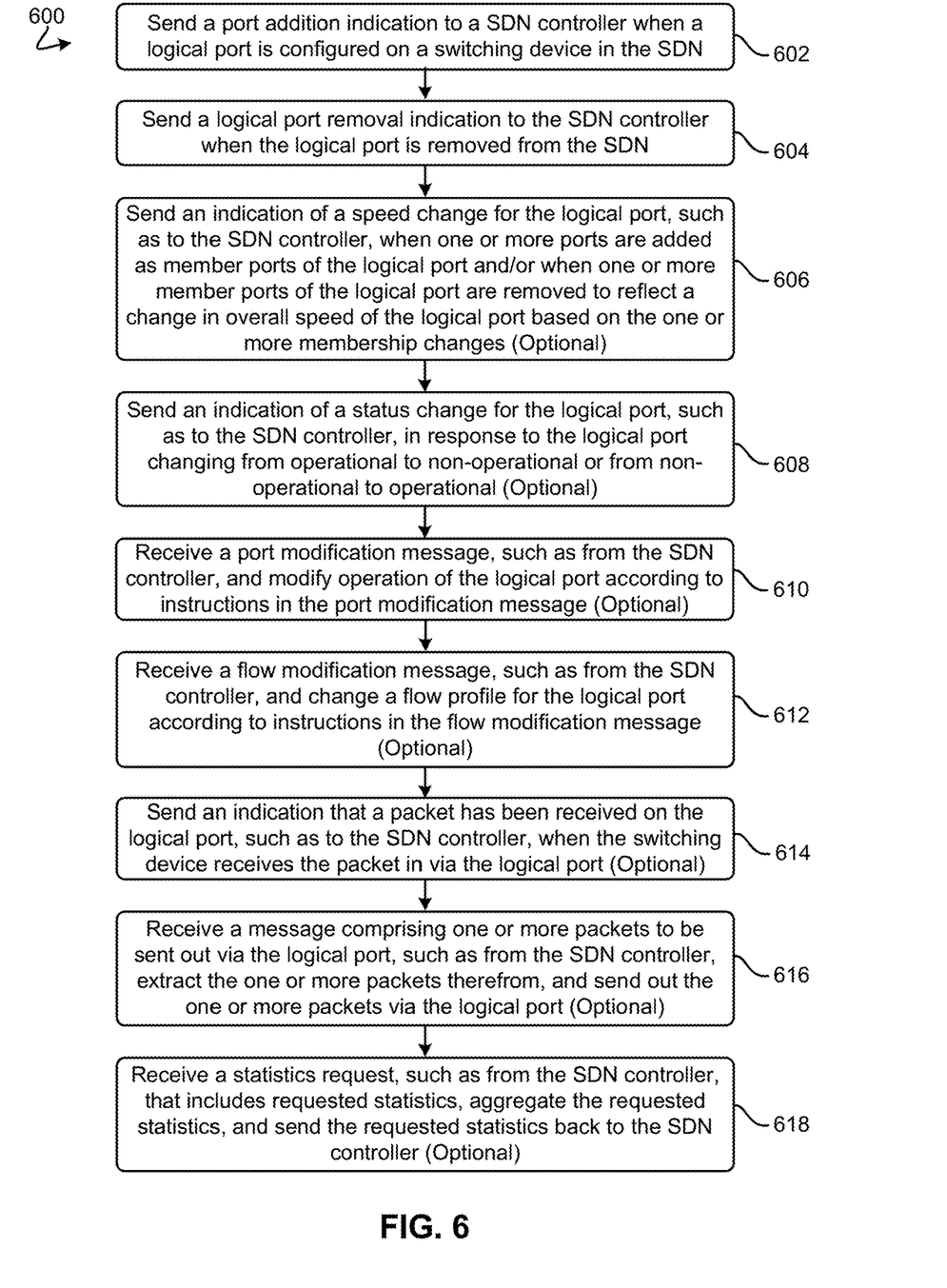
FIG. 6 shows another flow chart of a method according to an embodiment.

In one embodiment, referring to FIG. 6 a method 600 for providing a LAG in a SDN is shown according to one embodiment. The method 600 may be executed by a system using a processor which is configured to execute or otherwise cause the execution of embedded or standalone logic (which may be hardware, software, or a combination thereof) according to one embodiment. In another embodiment, the method 600 may be executed by a computer program product which comprises a computer readable storage medium having computer program code stored therein.

The method 600 may be performed in accordance with the present invention in any of the environments depicted in FIGS. 1-4 among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in one embodiment, the method 600 may be partially or entirely performed by a host, a server, a router, a switch, a switch controller (such as a SDN controller, an OpenFlow controller, etc.), a processor, e.g., a CPU, an ASIC, a FPGA, etc., one or more NICs, one or more virtual NICs, one or more virtualization platforms, or any other suitable device or component of a network system, cluster, or group of clusters.

In operation 602, a port addition indication may be sent to a SDN controller when a logical port is configured on a switching device in the SDN. This provides the SDN controller with indication that the logical port (LAG) is setup and ready to be utilized.

In operation 604, a logical port removal indication may be sent to the SDN controller when the logical port is removed from the SDN, so that the SDN controller no longer attempts to send traffic via the logical port.

In optional operation 606, an indication of a speed change for the logical port may be sent, such as to the SDN controller, when one or more ports are added as member ports of the logical port and/or when one or more member ports of the logical port are removed to reflect a change in overall speed of the logical port based on the one or more membership changes.

In optional operation 608, an indication of a status change for the logical port may be sent, such as to the SDN controller, in response to the logical port changing from operational to non-operational or from non-operational to operational. In this way, the SDN controller is made aware of the operational status for the logical port.

In optional operation 610, a port modification message may be received, such as from the SDN controller, and operation of the logical port may be modified according to instructions in the port modification message. In this way, the SDN controller is able to request specific changes to the operation of the logical port, according to protocols and standards known in the art, such as OpenFlow among others.

In optional operation 612, a flow modification message may be received, such as from the SDN controller, and a flow profile may be changed for the logical port according to instructions in the flow modification message. In this way, the SDN controller is able to request specific changes to the flow profile of the logical port, according to protocols and standards known in the art, such as OpenFlow among others.

In optional operation 614, an indication that a packet has been received on the logical port may be sent, such as to the SDN controller, when the switching device receives the packet in via the logical port. This provides the SDN controller with notice of packets being received on the logical port.

In optional operation 616, a message comprising one or more packets to be sent out via the logical port may be received, such as from the SDN controller, the one or more packets may be extracted therefrom, and the one or more packets may be sent out via the logical port thereafter.

In optional operation 618, a statistics request may be received, such as from the SDN controller, that includes requested statistics, the requested statistics may be aggregated, and the requested statistics may be sent back to the SDN controller, in one embodiment.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an ASIC, a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a CPU, an integrated circuit (IC), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

A system, in the context of FIGS. 5-6, may include, according to one embodiment, a SDN controller comprising a processor and logic integrated with and/or executable by the processor. The logic may be configured to receive a port addition indication that a logical port is configured on a switching device, the switching device being connected to the SDN controller and a second device, wherein the logical port represents a LAG that comprises at least two links between the switching device and the second device, and derive and maintain a logical index for all logical ports in software-defined switching devices connected to the SDN controller based on logical port identifiers thereof.

A computer program product, in the context of FIGS. 5-6, may include, according to one embodiment, a computer readable storage medium having program code embodied therewith. The program code may be readable and/or executable by a processor to cause the processor to: send a port addition indication to a SDN controller when a logical port is configured on a switching device in the SDN, the switching device being connected to the SDN controller and a second device, wherein the logical port represents a LAG that comprises at least two links between the switching device and the second device, send a logical port removal indication to the SDN controller when the logical port is removed from the SDN, send an indication of a speed change for the logical port when one or more ports are added as member ports of the logical port and/or when one or more member ports of the logical port are removed to reflect a change in overall speed of the logical port based on the one or more membership changes, and send an indication of a status change for the logical port to the SDN controller in response to the logical port changing from operational to non-operational or from non-operational to operational.

Of course, any of the other embodiments described in relation to FIGS. 5-6 may be included in the system and/or the computer program product as would be understood by one of skill in the art.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system, comprising:
   a software-defined network (SDN) controller comprising a processing circuit and logic executable by the processing circuit to:
   receive a port addition indication that a logical port is configured on a switching device, the switching device being coupled to the SDN controller and a second device, wherein the logical port represents a link aggregation group (LAG) that comprises at least two links between the switching device and the second device, and the port addition indication includes a logical port identifier for the logical port; and
   add the logical port identifier for the logical port to a logical index for all logical ports in software-defined switching devices coupled to the SDN controller;
   send, to the switching device, a request for statistics related to the logical port, the statistics including packets sent, packets received, and delay; and
   receive, from the switching device, the statistics related to the logical port, in response to the request.

2. The system according to claim 1, wherein the logic is further executable by the processing circuit to:
   receive an indication of a speed change for the logical port;
   store a speed for the logical port in association with the logical port identifier within the logical index;
   receive an indication of a status change for the logical port;
   indicate a status for the logical port in the logical index, in response to receiving the indication of the status change; and
   send, to the switching device, a message comprising at least one packet to be sent out via the logical port.

3. The system according to claim 1, wherein the logic is further executable by the processing circuit to:
   send a port modification message to the switching device, where the port modification message indicates at least one modification to an operation of the logical port;
   send a flow modification message to the switching device, where the port modification message indicates at least one modification to a flow profile for the logical port; and
   send, to the switching device, a message comprising at least one packet to be sent out via the logical port.

4. The system according to claim 1, wherein the logic is further executable by the processing circuit to:
   receive a logical port removal indication from the switching device, the logical port removal indication being a port remove message that comprises a logical port identifier for the logical port; and
   remove the logical port identifier from the logical index in response to receiving the logical port removal indication.

5. The system according to claim 1, wherein the logic is further executable by the processing circuit to:
   receive an indication of a speed change for the logical port from the switching device, the indication of the speed change representing at least one membership change for the logical port; and
   store a speed for the logical port in the logical index in association with the logical port identifier for the logical port.

6. The system according to claim 1, wherein the logic is further executable by the processing circuit to:
   receive an indication of a status change for the logical port from the switching device, the status change representing whether the logical port is operational or non-operational; and
   indicate a status for the logical port in the logical index selected from a group of statuses comprising: operational and non-operational.

7. The system according to claim 1, wherein the logic is further executable by the processing circuit to send a port modification message to the switching device that indicates at least one modification to operation of the logical port.

8. The system according to claim 1, wherein the logic is further executable by the processing circuit to send a flow modification message to the switching device that indicates at least one change to a flow profile for the logical port.

9. The system according to claim 1, wherein the logic is further executable by the processing circuit to receive, from the switching device, indication that a packet has been received on the logical port in response to a determination that the switching device has received the packet in via the logical port.

10. The system according to claim 1, wherein the logic is further executable by the processing circuit to:
    send a port modification message to the switching device, where the port modification message indicates at least one modification to an operation of the logical port;
    send a flow modification message to the switching device, where the port modification message indicates at least one modification to a flow profile for the logical port;
    send, to the switching device, a request for statistics related to the logical port, the statistics including packets sent, packets received, and delay;
    receive, from the switching device, the statistics related to the logical port, in response to the request; and
    send, to the switching device, a message comprising at least one packet to be sent out via the logical port.

11. A computer-implemented method comprising:
    receiving a port addition indication at a software-defined network (SDN) controller that a logical port is configured on a switching device, the switching device being coupled to the SDN controller and a second device, wherein the logical port represents a link aggregation group (LAG) that comprises at least two links between the switching device and the second device, and the port addition indication includes a logical port identifier for the logical port; and adding the logical port identifier for the logical port to a logical index for all logical ports in software-defined switching devices coupled to the SDN controller;

sending, to the switching device, a request for statistics related to the logical port, the statistics including packets sent, packets received, and delay; and receiving, from the switching device, the statistics related to the logical port, in response to the request.

12. The method according to claim 11, further comprising:

receiving an indication of a speed change for the logical port;

storing a speed for the logical port in association with the logical port identifier within the logical index;

receiving an indication of a status change for the logical port;

indicating a status for the logical port in the logical index, in response to receiving the indication of the status change; and sending, to the switching device, a message comprising at least one packet to be sent out via the logical port.

13. The method according to claim 11, further comprising:

sending a port modification message to the switching device, where the port modification message indicates at least one modification to an operation of the logical port;

sending a flow modification message to the switching device, where the port modification message indicates at least one modification to a flow profile for the logical port; and sending, to the switching device, a message comprising at least one packet to be sent out via the logical port.

14. The method according to claim 11, further comprising:

receiving an indication of a speed change for the logical port from the switching device, the indication of the speed change representing at least one membership change for the logical port;

storing a speed for the logical port in the logical index in association with the logical port identifier for the logical port;

receiving an indication of a status change for the logical port from the switching device, the status change representing whether the logical port is operational or non-operational;

indicating a status for the logical port in the logical index selected from a group of statuses comprising: operational and non-operational;

sending a port modification message to the switching device that indicates at least one modification to operation of the logical port; and sending a flow modification message to the switching device that indicates at least one change to a flow profile for the logical port.

15. The method according to claim 11, further comprising:

receiving, from the switching device, indication that a packet has been received on the logical port in response to a determination that the switching device has received the packet in via the logical port;

sending to the switching device a message comprising at least one packet to be sent out via the logical port; and sending a second statistics request to the switching device to request second statistics related to the switching device.

16. The method according to claim 11, further comprising:

receiving an indication of a speed change for the logical port in response to at least one determination selected from: a determination that at least one port has been added as member ports of the logical port, and a determination that at least one member port of the logical port is removed to reflect a change in overall speed of the logical port; and receiving an indication of a status change for the logical port at the SDN controller in response to the logical port changing a status selected from a group of statuses comprising: operational and non-operational.

17. The method according to claim 11, further comprising:

sending a port modification message to the logical port specifying instructions to modify operation of the logical port;

sending a flow modification message to the logical port specifying instructions to change a flow profile for the logical port;

receiving at the SDN controller an indication that a packet has been received on the logical port in response to a determination that the switching device has received the packet in via the logical port; and sending to the logical port a message comprising at least one packet to be sent out via the logical port.

18. A computer program product, the computer program product comprising a computer readable storage medium having program code embodied therewith, the program code executable by a processor to:

receive a port addition indication that a logical port is configured on a switching device, the switching device being coupled to a software-defined network (SDN) controller and a second device, wherein the logical port represents a link aggregation group (LAG) that comprises at least two links between the switching device and the second device, and the port addition indication includes a logical port identifier for the logical port; and add the logical port identifier for the logical port to a logical index for all logical ports in software-defined switching devices coupled to the SDN controller;

send, to the switching device, a request for statistics related to the logical port, the statistics including packets sent, packets received, and delay; and receive, from the switching device, the statistics related to the logical port, in response to the request.

* * * * *